(No Model.) 4 Sheets—Sheet 1.

P. R. HUNT.
CORN HARVESTER.

No. 491,889. Patented Feb. 14, 1893.

Witnesses.
J. F. Coleman
M. C. Massie

Inventor
P. R. Hunt
By Wm Hunter Myers
Atty.

(No Model.) 4 Sheets—Sheet 2.
P. R. HUNT.
CORN HARVESTER.
No. 491,889. Patented Feb. 14, 1893.
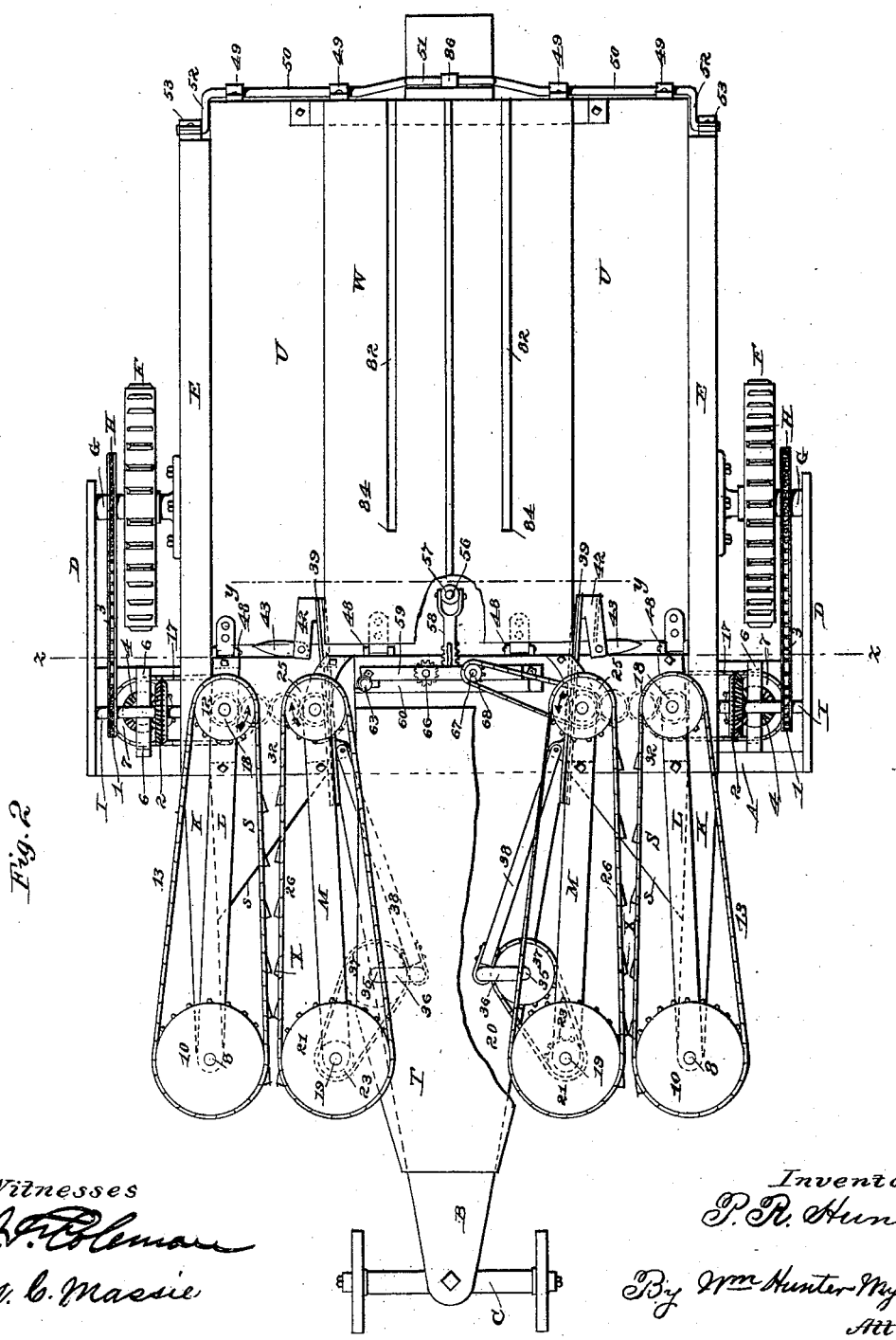

(No Model.) 4 Sheets—Sheet 3.
P. R. HUNT.
CORN HARVESTER.
No. 491,889. Patented Feb. 14, 1893.
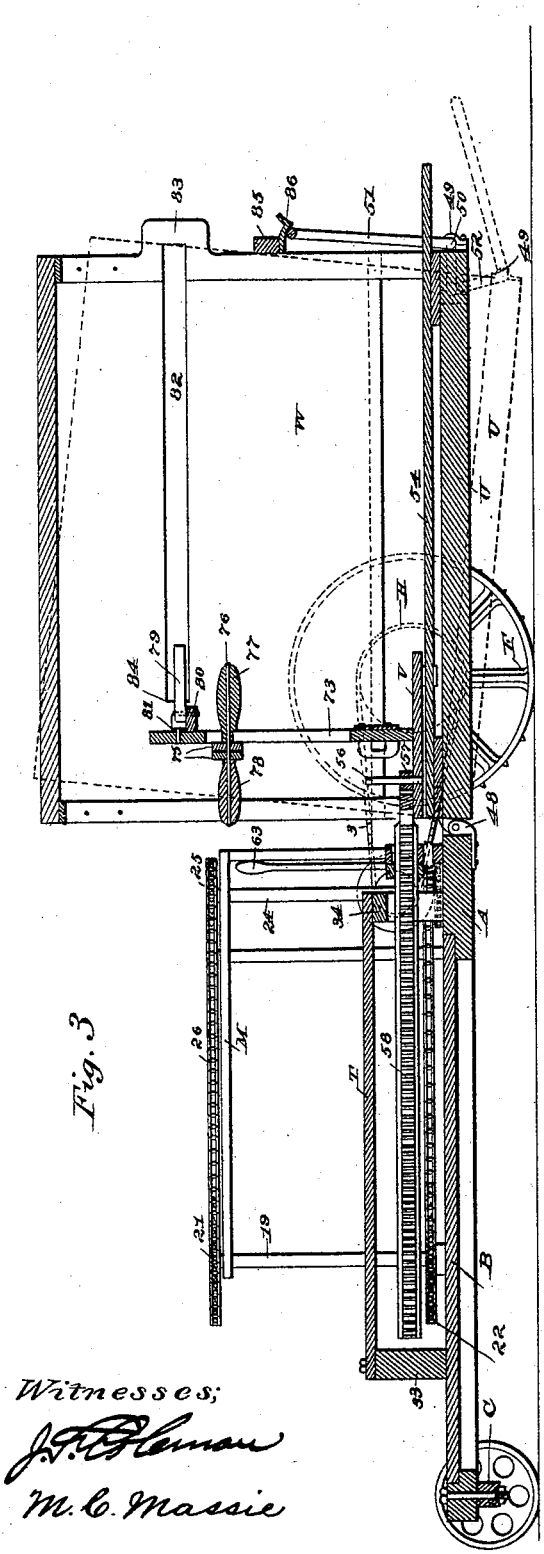
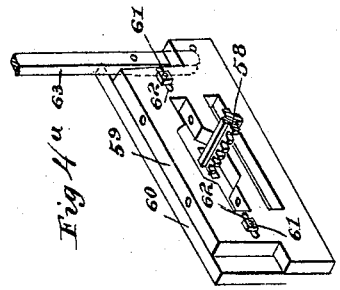
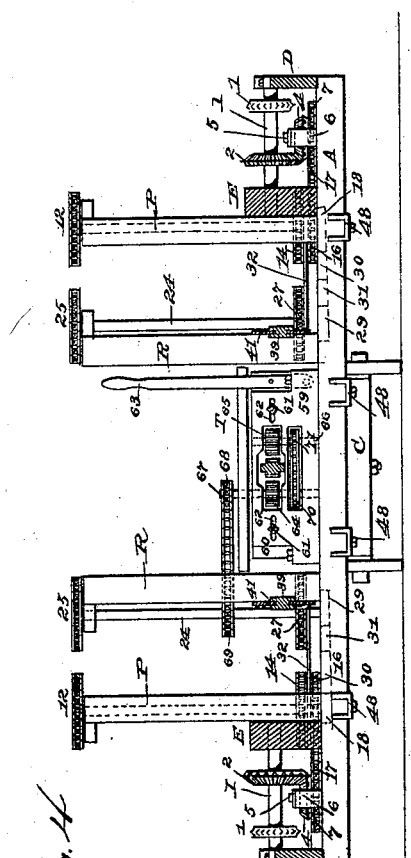
Witnesses:
Inventor
P. R. Hunt
By Wm Hunter Myers
Att'y.

(No Model.) 4 Sheets—Sheet 4.
P. R. HUNT.
CORN HARVESTER.

No. 491,889. Patented Feb. 14, 1893.

Witnesses
J. V. Coleman
M. C. Massie

Inventor
P. R. Hunt
By Wm Hunter Myers
Att'y

UNITED STATES PATENT OFFICE.

PRESTON R. HUNT, OF PLATTSVILLE, ASSIGNOR OF ONE-HALF TO ALBERT J. CORY, OF TAWAWA, OHIO.

CORN-HARVESTER.

SPECIFICATION forming part of Letters Patent No. 491,889, dated February 14, 1893.

Application filed April 19, 1892. Serial No. 429,781. (No model.)

*To all whom it may concern:*

Be it known that I, PRESTON R. HUNT, a citizen of the United States of America, residing at Plattsville, in the county of Shelby and State of Ohio, have invented certain new and useful Improvements in Corn-Harvesters, of which the following is a specification, reference being had therein to the accompanying drawings.

My invention relates to corn-harvesting machines; and it has for its object the production of a harvester capable of cutting two rows of corn at the same time, placing the cut stalks on the machine in a position to be bound into a shock, and automatically ejecting the shock from the machine.

Figure 1:
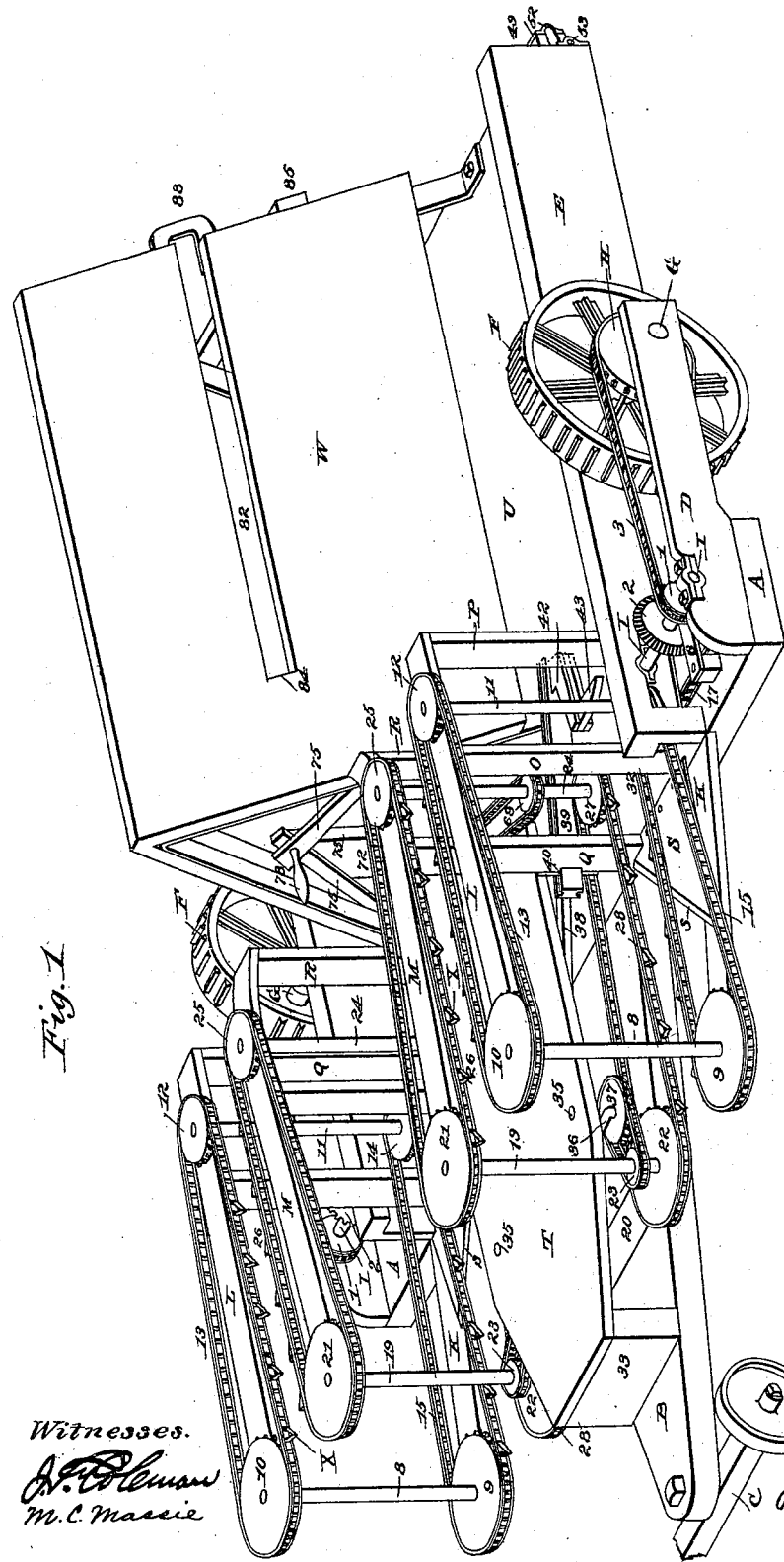
Figure 5:
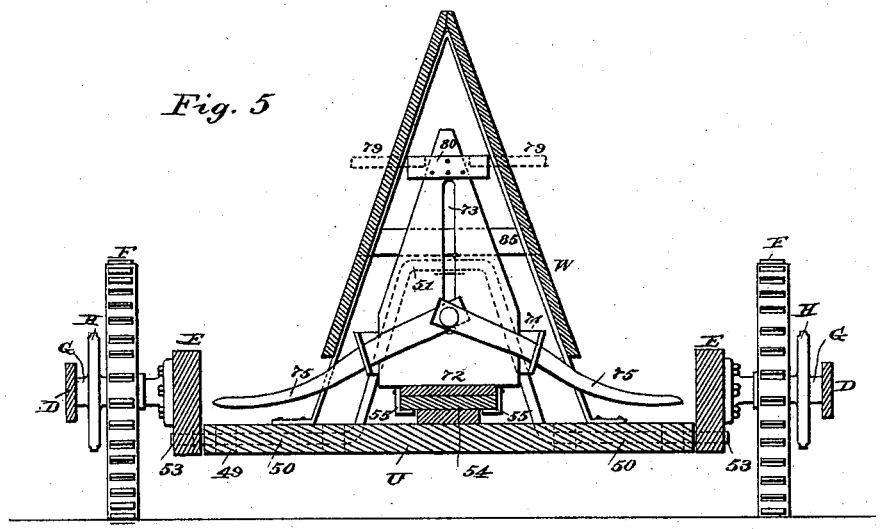
Figure 6:
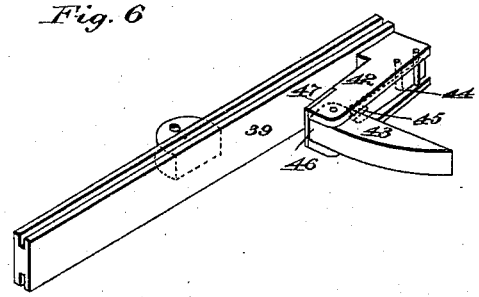
Figure 7:
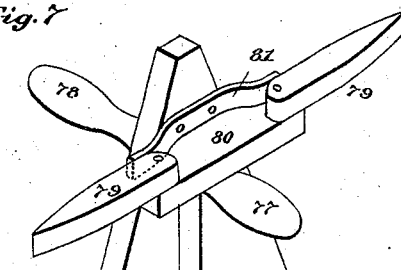

Figure 1 is a perspective view of a corn-harvester embodying my invention; Fig. 2, a plan view of the same; Fig. 3, a longitudinal sectional view taken through the center of the machine; Fig. 4, a sectional end elevation taken on line z—z, Fig. 2, looking forward; Fig. 4ª is a perspective view of the mechanism for shifting the rack-bar; Fig. 5, a sectional end elevation taken on line y—y, Fig. 2, looking rearward; Fig. 6, a perspective detail view of one of the packer slide-bars and its attached spring-finger; Fig. 7, a perspective view of the shock-ejector; and Fig. 8, a perspective view of a portion of one of the sprocket feed chains provided with my improved gathering-teeth.

In the drawings, A is a cross-beam, to the middle of which is attached a front platform B, projecting forward. The front end of this platform is carried by the front truck C, which is adapted to pass between two rows of corn. At each end of the cross beam A are attached, at right angles thereto, bracket-arms D, projecting horizontally rearward. At a short distance inward from the ends of the cross-beam A are secured side sills E, parallel with and extending some distance in rear of bracket-arms D. The main wheels F are fixed to the axles G, which are journaled on the side sills E and bracket-arms D, and are placed at such a distance apart as to pass outside two rows of corn. On the axles G are also fixed the sprocket-wheels H. Parallel with the cross-beam A are the horizontal revoluble shafts I, journaled in the sills and bracket-arms, on which are fixed the sprocket-wheels 1 and the bevel gear wheels 2. The sprocket-wheels 1 are connected with the sprocket-wheels H on main axles by sprocket chains 3. The bevel-wheels 2 mesh into and drive small bevel-pinions 4, fixed on short vertical pinion-shafts 5, stepped at their lower ends in the cross-beam A and journaled at their upper ends in longitudinal frames 6, supported on the cross-beam. Upon these vertical pinion-shafts 5, and just beneath the bevel gear wheels 4, are the sprocket-wheels 7. Projecting forward horizontally from the cross-beam A, at the forward end of the side sills, are the lower outer arms K.

O and P are vertical posts or stanchions, upon the tops of which are fastened the horizontal forwardly-projecting arms L, at right angles to the cross-beam.

8 are vertical revoluble shafts, the upper ends of which are journaled in the upper arms L and the lower ends stepped in the lower arms K. On the shafts 8 are fixed sprocket-wheels 9 and 10, one at the upper end and one at the lower end of each shaft.

11 are vertical revoluble shafts, the upper ends of which are journaled in the upper arms L and the lower ends stepped in the cross-beam A. On these shafts are fixed sprocket-wheels 12, connected with sprocket-wheels 10 by feed chains 13, and also sprocket-wheels 14, connected by chains 15 with wheels 9. Near the lower ends of shafts 11 are fixed sprocket-wheels 16, driven by chains 17 from sprocket-wheels 7 on the vertical pinion-shafts 5.

18 are gear wheels fixed to the lower ends of vertical shafts 11.

Q and R are stanchions attached to the cross-beam A, Q on the front edge of the cross-beam and R on the rear edge, stanchions R being farther in from the ends of the cross-beam than stanchions Q. To the tops of these stanchions are fastened the horizontal forwardly-projecting arms M, whose rear ends curve inwardly, as clearly shown in Figs. 1 and 2.

19 are vertical revoluble shafts, the upper ends of which are journaled in the arms M and the lower ends stepped in a transverse beam 20 fixed in the front platform B. On these vertical shafts are fixed the sprocket-wheels 21, 22, and 23.

Figure 8:
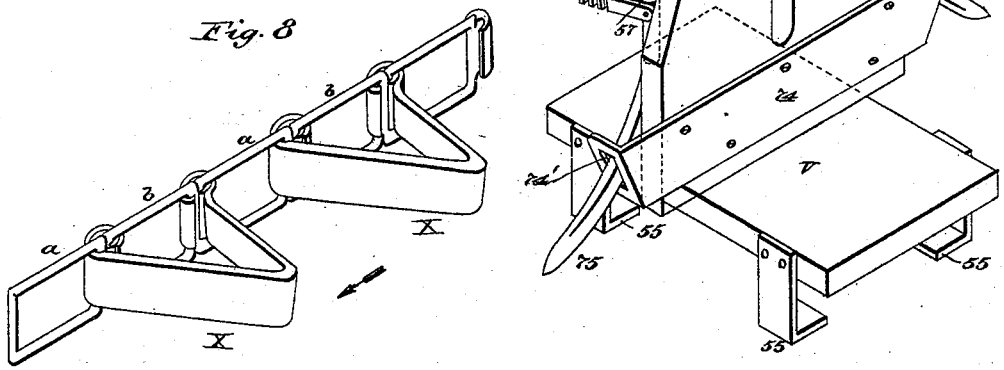

At the rear of arms M are the vertical revoluble shafts 24, journaled at their upper ends in the rear end of arms M and stepped in the cross-beam A. On these shafts are fixed sprocket-wheels 25, connected with the sprocket-wheels 21 by the sprocket-chains 26, and also the wheels 27, connected with the wheels 22 by the chains 28. On the lower ends of shafts 24 are cog-wheels 29. Between cog-wheels 29 and 18 and meshing with them and with each other, are the cog-wheels 30 and 31, for transmitting motion from the outer shafts 11 to the inner shafts 24, the cross-beam being recessed to receive gear-wheels 18, 30, 31, and 29. Chains 13, 15, 26, and 28 not only transmit motion from the rear shafts to the front shafts, but are feed chains also, on which at intervals are gathering-teeth X, a detail view of which is shown in Fig. 8. Each tooth is formed from a flat bar of metal, bent to an angle, and having its two ends wrapped around and loose upon the joints of two adjacent links $a$, $b$, Fig. 8, the ends of said tooth thereby being separated by the length of one link only. By this construction not only is the usual flexibility of the chain preserved, but the chain itself is strengthened and the teeth readily replaced in case of breakage. One face of each tooth is perpendicular to the link between the ends of the tooth, the other face being inclined; and in plan each tooth would be a right-angle triangle, the link being the base, the inclined side the hypotenuse, and the other side the perpendicular. The outer feed-chains 13 and 15 pass outside of the rows of corn and the inner feed-chains 26 and 28 pass inside the rows. The contiguous portions of the inner and outer chains move toward the rear, and the teeth on one are opposite those on the other, the inclined sides of the teeth being toward the rear, as seen in Fig. 8, wherein the arrow indicates the direction of movement of the chains.

In the inner angles formed by the cross-beam A and the outer lower arms K are placed triangular knives S, whose forward edges incline toward the center of the machine. The tops of the knives are above the level of the sprocket-wheels 15. Over these sprocket-wheels 16 and also over gear-wheels 18, 30, 31, and 29 are placed plates 32, their tops being flush with the tops of knives S, so that the corn, when cut and passing to the rear of the machine, cannot catch in these wheels.

Over the front platform B and a short distance above is a deck T, supported at each end by timbers 33 and 34 fixed upon the front platform. Vertical revoluble crank-shafts 35 are journaled at their upper ends on each side of the deck, near its front, and stepped at their lower ends in the front platform. On these shafts and integral therewith are formed the cranks 36.

Fixed on shafts 35, below the cranks, are the sprocket-wheels 37, driven by chains from sprocket-wheels 23 on vertical shafts 19. The cranks 36 drive connecting-rods 38, which are pivotally connected with and impart a reciprocating motion to slide-bars 39, moving in slideways 40 and 41, the former being located in the inner side of stanchion Q and the latter in the outer side of stanchion R. Thus the slide-bars 39 move at an angle with the cross-beam, and their ends project rearward some distance beyond stanchions R. To the rear end of the slide-bars 39 are fixed L-shaped blocks 42, Fig. 6, at such an angle as to have their longest sides parallel to the length of the machine.

43 are fingers, which are pivoted to the forward ends of the blocks 42, and are pressed outward by the leaf-springs 44 set in recesses in said blocks. The rear ends of these springs are fastened to the blocks and the other ends press on pins 45 projecting from the rear sides of the fingers 43, as shown by dotted lines in Fig. 6. These fingers are prevented from swinging any farther forward than to a position at right angles to the blocks by their square corners 46 abutting against the plates 47 fastened to the blocks 42, the opposite corners of said fingers being rounded off to permit them to close rearwardly against said blocks.

Between the two side sills E is a rear platform U, hinged at its forward end to the lugs 48, attached to the rear edge of cross-beam A. Journaled on the rear end of the hinged platform at 49 is the transverse bar 50, with its central portion formed into a crank lever 51, and its ends having cranks 52 at right angles to the said lever 51, the said cranks 52 being journaled on the side sills at 53. When the hinged platform is up the crank-lever projects upward from the transverse bar, and is held by a catch, which will be described hereinafter. When the lever is swung backward the rear end of the hinged platform is lowered, as shown by the dotted line in Fig. 3.

In the center of the hinged platform is a longitudinal slideway 54, on which moves the shock-ejector V provided with lugs 55 for holding it in position on said slideway; and in the forward end of this ejector is secured an upright stud 56, on which is a movable collar 57. To this collar is pivoted the rear forked end of a double rack-bar 58, feathered on its top and bottom. This double rack-bar projects through an opening in a frame 59 fixed transversely on the cross-beam A, and passes through a slideway in a sliding-frame 60, movably attached to the forward side of the transverse frame 59 by bolts 61, passing through the sliding frame 60 and through slots 62 in the transverse frame, as is plainly shown in Fig. 4$^a$.

63 is a lever, fulcrumed on the cross-beam, at its lower end, pivotally attached near its middle to one end of the sliding frame 60, and projecting above the deck T. By means of this lever the sliding frame may be moved back and forth transversely of the machine. The slideway in this frame 60, through which the double rack-bar 58 projects, has an upper and a lower slot, with which engage the top and bottom feathers on the rack-bar, whereby when the sliding frame 60 is moved by the lever 63 the rack-bar is also moved with it, swinging on its pivotal attachment to the shock-ejector; and the rack-bar is also movable longitudinally in the slideway of sliding frame 60.

64 and 65 are gear-pinions fastened to vertical revoluble shafts 66 and 67, journaled at their upper ends in the transverse frame 59 and stepped at their lower ends in the cross-beam A, one on each side of the slideway in sliding frame 60. Shaft 67 is extended some distance above the deck T, and has at its upper end a sprocket-wheel 68, driven by a chain from wheel 69 on shaft 24. At the lower end of shafts 66 and 67 are sprocket-wheels 70 and 71, connected by a chain. When the double rack-bar is thrown to one side by means of the lever 63, so as to mesh one of its side racks with gear-pinion 64, and when the machinery is in motion, it will be drawn forward and with it the shock-ejector V. When the rack-bar 58 is thrown to the opposite side, so as to mesh its other side-rack with gear-pinion 65, the rack-bar, and with it the shock-ejector, will be pushed to the rear. When the rack-bar is in the middle, between the two gear-pinions 64 and 65, the racks do not mesh with either pinion, and therefore the rack-bar and ejector are stationary.

The shock-ejector V is provided with an inverted V-shaped upright 72, slotted centrally as at 73, and having at its lower end a guide plate 74, whose ends are bent forward and slotted as at 74'. Movable through and guided by these slots are the curved ejector-arms 75, the inner ends of which are pivoted together by the bolt 76, passing through the slot 73 in the upright and having the handles 77 and 78 at each end for the purpose of moving the bolt up and down in the slot. The curved arms 75 are of such shape and length that when the bolt 76 is drawn to the bottom of the slot 73, they extend out nearly to the side sills, one on each side, and but a short distance above the hinged platform. On the top of the rear side of upright 72 are ejector-fingers 79, pivoted at their inner ends to a shelf 80, fixed on the upright. They swing in a horizontal plane, their forward motion being limited to a position at right angles to the length of the machine by the leaf-spring 81 fastened to the upright 72. The inner ends of these fingers are rounded, so that while the tendency of the spring 81 is to keep them normally extended, yet they will be permitted to swing rearwardly until they are parallel with each other.

Over the shock-ejector is placed the A-shaped shock-frame W, extending the full length of and secured to the hinged platform U. On each side, at the bottom, the covering is cut away, so as to permit the curved ejector-arms 75 to project through when they are thrown outward by the downward movement of the pivot-bolt 76, they being drawn within the shock-frame W when said bolt is raised. Near the top of this shock-frame, on each side, are horizontal slots 82, which are extended beyond the frame by the loops 83 attached thereto. Through these slots project the ejector-fingers 79, which, as before stated, are held in an outwardly-projecting position by the spring 81, and are closed within the frame by abutting against the ends 84 of said slots. On the rear end of the shock frame is the cross-bar 85, to the center of which is attached a spring catch 86, which holds the top end of the crank-lever 51 in its closed position.

The operation of my machine is as follows: The machine being drawn along two rows of corn, the front truck passing between the two rows and the main wheels passing outside of them, the gathering mechanism is set in motion by the revolution of the main wheels F. The teeth on the sprocket feed chains 13, 15, 26, and 28 catch the corn-stalks and draw them toward the knives S, by which they are severed, when they are pushed rearward by the fingers 43 of the packers, the stalks being given an inward incline by the curved ends of the arms M, thus causing them to lean against the inclined sides of the shock frame. When a sufficient quantity for a shock has been cut and gathered onto the platform U, the machine is stopped, and the corn on each side of the shock frame is bound together into one shock by hand, the bands or ties being fastened around the corn above the top of the shock frame. During this time the shock-ejector has been at the forward end of the platform. When the shock is bound, the driver, standing on the deck T, throws down the handle 78, and thereby forces the ejector-arms out and in front of the shock. The catch 86, at the rear of the machine, is then raised, permitting the crank-lever 51 to swing down and lower the rear end of the hinged platform to the ground. The lever 63 is drawn to one side, so as to mesh the gear-pinion 65 with the rack-bar 58, and the machine started forward. By the revolution of the pinion 65 the pivoted rack-bar is moved backward, forcing the shock ejector rearward, when the ejector arms and fingers push the shock off the slanting platform to the ground. When the shock of corn is discharged from the machine, the crank-lever 51 is raised and fastened by the spring-catch, thus raising and holding the rear end of the hinged platform. The ejector-arms 75 are now drawn up by the handle 77 and the lever 63 thrown to the other side, so as to engage gear-pinion 64 with the rack-bar 58, when the carriage will be drawn forward, and the ejector-fingers will be folded in under the shock-frame W by their contact with the incoming corn-stalks. On the arrival of the ejector at the forward end of the platform the lever 63 is thrown so as to disengage the rack-bar from the pinion 64 and hold it between both pinions 64 and 65. When the machine is again started forward for the purpose of removing the shock, as decribed above, the gathering and cutting mechanisms are again put in operation, so that by the time the ejector has arrived at the forward end of the platform, there is more corn on the machine, and when enough for another shock has been cut the operation is repeated as before.

As the shock-frame is wider at its base than at its top, it is apparent that when the stalks are placed against it on each side and bound, as described, the shock, when removed from the platform, will have a central opening, thus permitting a free circulation of air through it, and also materially aiding to put the shock in the form of a rick.

Having thus fully described my invention, what I claim as new, and desire to secure by Letters Patent, is—

1. In a corn-harvester, a rear platform hinged at its front end, means for raising and lowering its rear end, and a shock-frame secured longitudinally and centrally on the platform.

2. In a corn-harvester, a rear platform hinged at its front end, means for raising and lowering its rear end, and a shock-frame secured on the platform, said shock-frame being wider at its base than at its top.

3. In a corn-harvester, a rear platform hinged at its front end, means for raising and lowering its rear end, and an A-shaped shock-frame secured on the platform.

4. In a corn-harvester, a rear platform hinged at its front end, means for raising and lowering its rear end, and an A-shaped shock-frame secured longitudinally on the platform.

5. In a corn-harvester adapted to cut two rows of corn at once, the combination, with a rear platform hinged at its front end and means for lowering and raising the rear end of said platform, of an A-shaped shock-frame secured longitudinally and centrally thereon, for the purposes stated.

6. In a corn-harvester, the combination, with a rear platform, hinged at its front end and means for raising and lowering its rear end, of an inclined shock-frame secured longitudinally thereon, cutters, and automatic mechanism for pushing the severed stalks away from the cutters and into a position to permit them to fall against said frame.

7. In a corn-harvester adapted to cut two rows of corn at once, the combination, with a rear platform, hinged at its front end and means for raising and lowering its rear end of an inclined shock-frame secured longitudinally thereon, cutters, automatic mechanism for pushing the severed stalks into a position to permit them to fall against said frame to be bound into a shock, and a shock-ejector.

8. In a corn-harvester adapted to cut two rows of corn at once, the combination, with a rear platform, hinged at its front end and means for raising and lowering its rear end of an inclined shock-frame secured longitudinally thereon, cutters, automatic mechanism for pushing the severed stalks into a position to permit them to fall against said frame to be bound into a shock, and an automatic shock-ejector.

9. In a corn-harvester adapted to cut two rows of corn at once, the combination, with a rear platform and a slotted inclined shock-frame secured longitudinally thereon, of a shock-ejector and means for reciprocating it, said ejector comprising a base, a slotted upright secured thereon, a shelf secured to the upper end of said upright, spring-pressed fingers pivoted on said shelf and adapted to extend through the slots in the shock-frame, and arms pivoted on a handle working in the slot in the upright.

10. In a corn-harvester adapted to cut two rows of corn at once, the combination, with a rear platform and a slotted inclined shock-frame secured longitudinally thereon, of a shock-ejector having spring-fingers opening outward in the slots in said frame and closed by contact with the front end of said slots and pivoted arms adapted to be thrown outward into the path of the shock and drawn within said frame, and means for reciprocating said ejector.

11. In a corn-harvester adapted to cut two rows of corn at once, the combination with a rear platform hinged at its front end and means for raising and lowering its rear end, of an inclined shock-frame secured longitudinally thereon, cutters, stalk-gathering mechanism operating parallel to the line of draft and forward of the cutters, packers, and a shock-ejector.

12. In a corn-harvester adapted to cut two rows of corn at once, the combination, with a rear platform hinged at its front end, means for raising and lowering the rear end of said platform, and an inclined shock-frame secured longitudinally on the platform, of a shock-ejector having a stud in its front end, a collar loosely mounted on said stud, a rack-bar loosely pivoted at one end to said collar and having teeth on opposite sides, two pinions, between which said bar is located, means for operating said pinions, and mechanism for shifting said bar into engagement with one or the other of the pinions.

13. In a gathering mechanism for corn-harvesters, the combination, with a sprocket-chain, of transversely-arranged gathering-teeth each of which is loosely attached to two joints of the links, substantially as described and for the purposes set forth.

14. In a gathering mechanism for corn-harvesters, the combination, with a sprocket-chain, of transversely-arranged gathering-teeth each of which is loosely attached to two joints of the links, the front face of each tooth, relative to the motion of the chain, standing at an obtuse angle to the chain and the rear face at a right angle to the chain.

In testimony whereof I affix my signature in presence of two witnesses.

PRESTON R. HUNT.

Witnesses:
S. F. APPLE,
S. M. MARTIN.